July 12, 1955

H. A. WINTERMUTE 2,712,858

APPARATUS FOR SEPARATING SUSPENDED MATERIALS FROM GASES

Filed Aug. 19, 1952

INVENTOR
HARRY A. WINTERMUTE

BY *Harold T. Stowell*

ATTORNEY

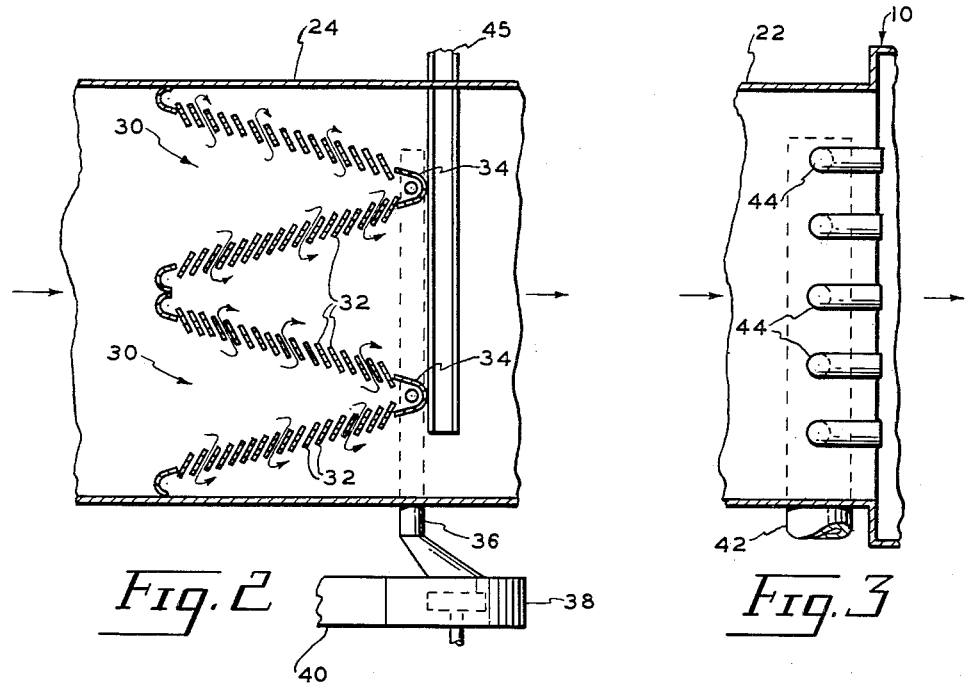
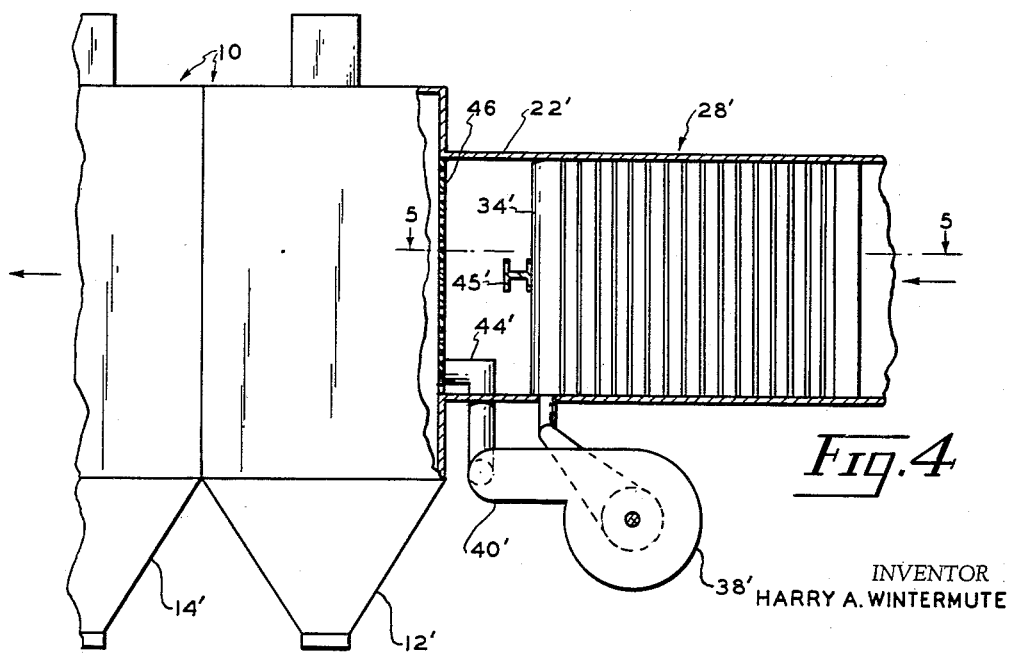

July 12, 1955 H. A. WINTERMUTE 2,712,858
APPARATUS FOR SEPARATING SUSPENDED MATERIALS FROM GASES
Filed Aug. 19, 1952 4 Sheets-Sheet 3
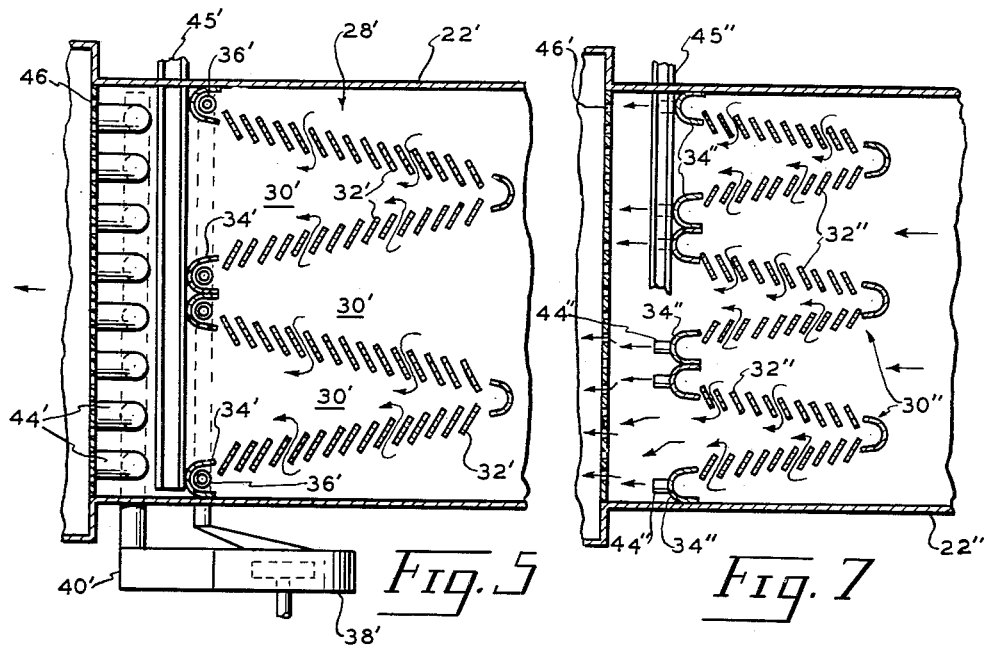
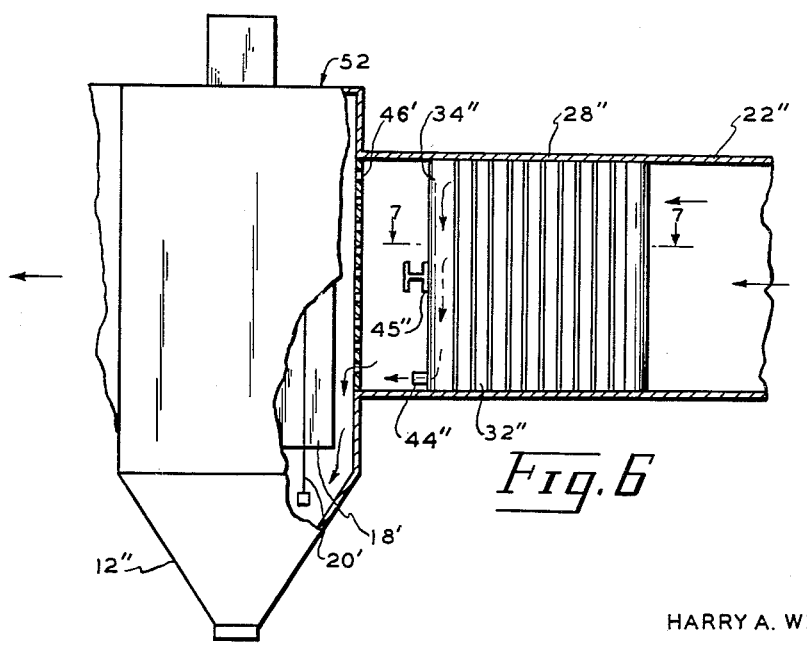
INVENTOR
HARRY A. WINTERMUTE
BY Harold T. Stowell
ATTORNEY July 12, 1955 H. A. WINTERMUTE 2,712,858
APPARATUS FOR SEPARATING SUSPENDED MATERIALS FROM GASES
Filed Aug. 19, 1952 4 Sheets-Sheet 4
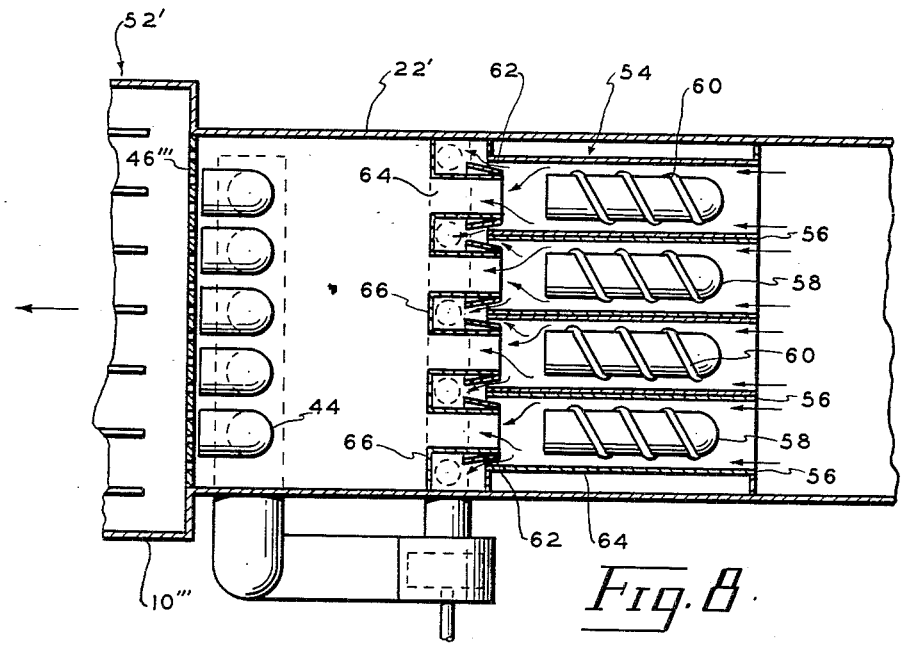
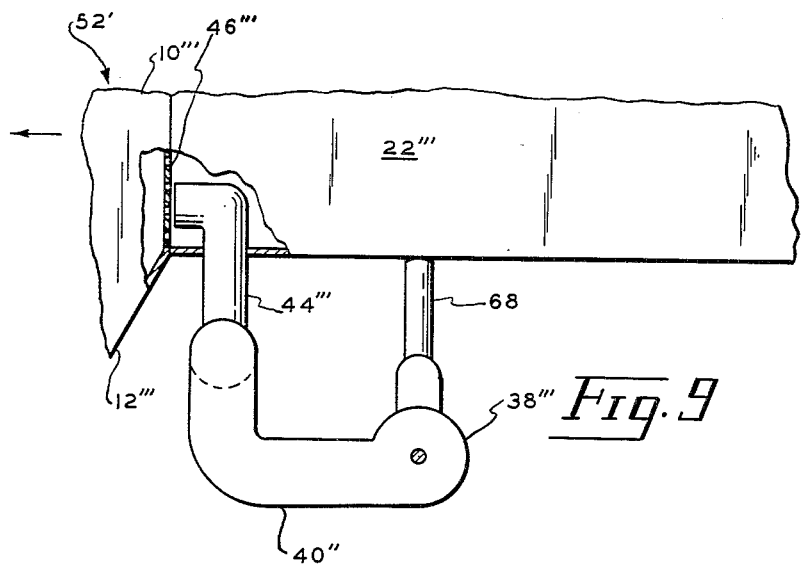
INVENTOR
HARRY A. WINTERMUTE
BY *Harold T. Stowell*
ATTORNEY United States Patent Office 2,712,858
Patented July 12, 1955

2,712,858

APPARATUS FOR SEPARATING SUSPENDED MATERIALS FROM GASES

Harry A. Wintermute, Plainfield, N. J., assignor to Research Corporation, New York, N. Y., a corporation of New York Application August 19, 1952, Serial No. 305,138

3 Claims. (Cl. 183—7)

This invention relates to an apparatus for separating suspended materials from gases, and in particular to a combination of electrical and mechanical separation of such materials.

It is a known practice to use mechanical dust separation devices in addition to electrostatic precipitation equipment to remove suspended particles from gas streams. However, such practices have not proven entirely satisfactory due to the increased expense of providing two or more distinct separation units, and the additional space requirements thereof.

It has been found that very satisfactory results are obtainable without substantially increasing the space requirements or the expense of operation by providing both units with a common dust collecting hopper. In the present invention the gas stream to be cleaned passes serially through both an electrostatic precipitation device including a dust receiving hopper, and a mechanical dust concentration device provided with flues which direct a small portion of the gas stream containing a large portion of the coarse and carboniferous particles to discharge points at the gas inlet end of the electrostatic precipitator adjacent the dust receiving hopper.

In carrying out my invention the mechanical collector or skimming device may be located at the inlet end of the electrostatic precipitation zone of the device and the skimmed material discharged adjacent the first dust collecting hopper, or the mechanical skimmers may be located adjacent the outlet end of the electrostatic precipitation zone, and the skimmed material discharged at the inlet end of the precipitation zone adjacent the first dust collecting hopper.

In general, the coarse and carboniferous materials referred to above are spread substantially uniformly throughout the gas stream to be cleaned. However, due to their electrical characteristics and low specific gravity, these particles drift along through the precipitation zone, and many of the particles, due to the height of the treating zone, are never trapped by falling into the dust hoppers. In gases wherein the content of such particles is high the overall precipitator efficiency may be reduced several per cent. By introducing these particles in the precipitating zone adjacent the first collecting hoppers as above set forth the efficiency of the precipitator is increased substantially.

Whether the coarse and carboniferous particles are to be collected at the inlet end of the electrostatic treating zone or at the gas outlet end is dependent upon many factors. However, in general, it may be stated that if the suspended material to be collected is very free falling from the collecting electrodes of the electrostatic treating zone, then it is desirable to place the mechanical skimming device at the inlet end of the precipitation zone. On the other hand, if the suspended material is of a cementitous nature and has a tendency to cling to the collecting electrodes, it is desirable to allow the coarse and carboniferous particles to travel throughout the entire electrostatic treating zone, since these particles tend to prevent the formation of tenacious deposits on the collecting electrodes.

On installations wherein the mechanical skimming device follows the electrostatic treating zone, in addition to the collection of the aforementioned coarse and carboniferous particles, agglomerates which escape collection in the dust hoppers are also collected, thereby increasing the overall efficiency of the system. An added feature of this form of the invention is that it substantially eliminates "rapping puffs" and "puffs" caused by dust falling from the collecting electrodes because of power failure in the electrostatic treating zone.

It is therefore a principal object of the invention to provide an improved apparatus for mechanical and electrostatic separation of suspended materials from gases, thereby substantially increasing the efficiency of particle separation from gas streams.

These and other objects and advantages are provided by apparatus for collecting suspended particles of the invention which generally comprises means for passing a stream of gas containing suspended particles through both a mechanical and an electrostatic particle collecting device, and discharging the collected particles from the mechanical collector in the gas stream at the inlet end of the electrostatic collector adjacent its dust receiving hoppers; and by the apparatus for separating suspended particles from gases comprising an electrostatic precipitator including complementary collecting and discharge electrodes, a particle receiving hopper beneath the complementary electrodes and a gas inlet and outlet means; a mechanical separator adapted to concentrate a portion of the suspended particles in a portion of the gas, conduit means directing a flow of gases through the mechanical collector and said electrostatic precipitator; and conduit means directing a stream of gas including the concentrated particles from the mechanical separator to the gas inlet of the electrostatic precipitator adjacent said receiving hopper.

The invention will be more particularly described with reference to the illustrative embodiments of the invention shown in the accompanying drawings, in which:

Fig. 2 is a view on line 2—2 of Fig. 1;

Fig. 3 is a view on line 3—3 of Fig. 1;

Fig. 4 is a fragmentary elevational view in partial section of a horizontal flow gas cleaning apparatus embodying another form of the invention;

Fig. 5 is a view on line 5—5 of Fig. 4;

Fig. 6 is a fragmentary elevational view in partial section of a horizontal flow gas cleaning device showing still another form of the invention;

Fig. 7 is a view on line 7—7 of Fig. 6;

Fig. 8 is a fragmentary sectional plan view of another form of the invention; and Fig. 9 is an elevational view in partial section of the device shown in Fig. 8.

Figure 1:
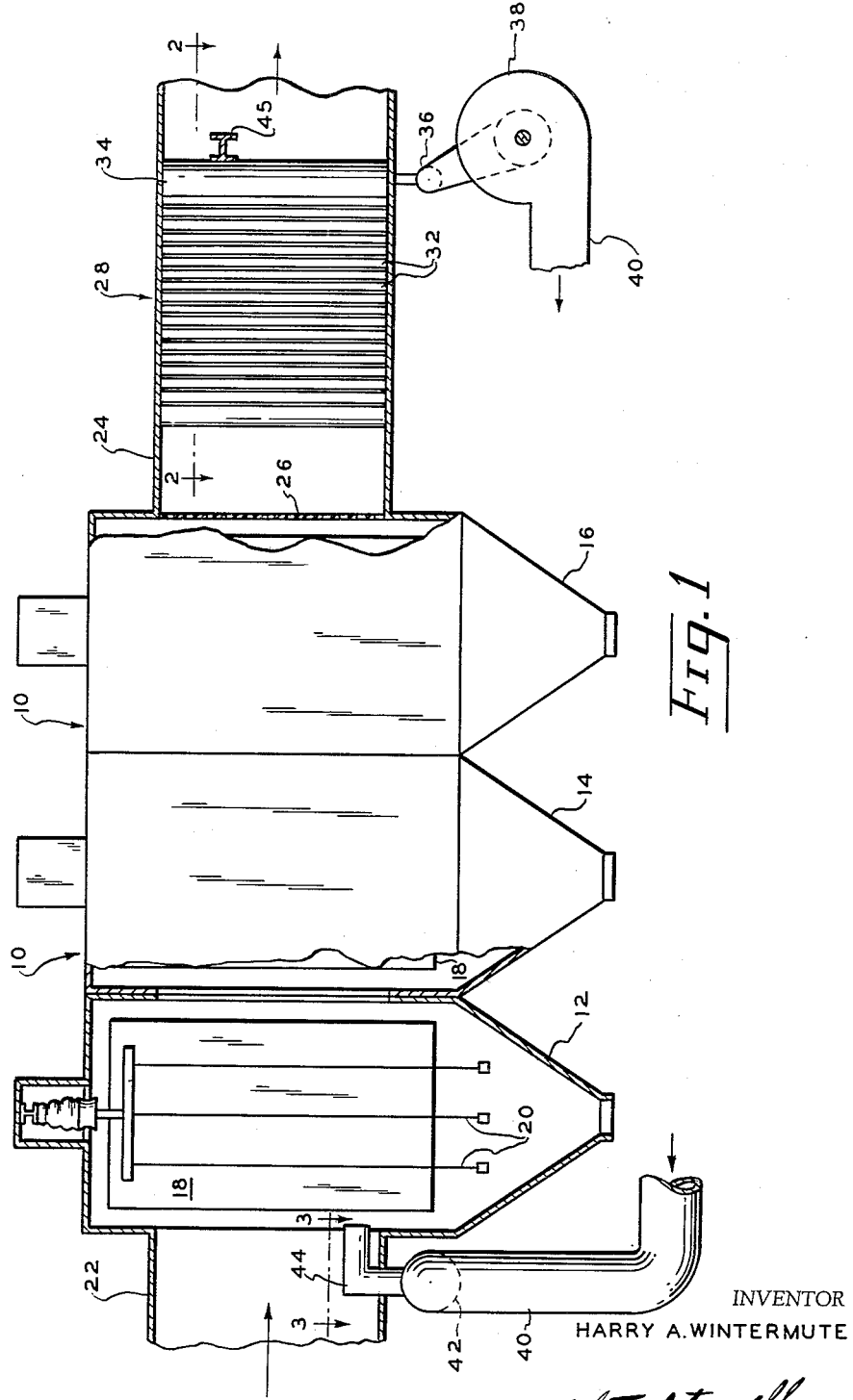
Fig. 1 is a fragmentary elevational view in partial section of a horizontal flow gas cleaning apparatus embodying the principles of the invention.

With reference to the drawings and in particular to Figs. 1 through 3, 10 are the casings of three series flow horizontal electrostatic precipitators having individual dust collecting hoppers 12, 14, and 16. Each of the precipitators is provided with complementary collecting plate and discharge electrodes 18 and 20 respectively. A gas inlet conduit 22 is provided at one end of the unit and a gas outlet conduit 24 is provided at the other end.

In the gas outlet conduit adjacent the gas distribution baffle plate 26 is a mechanical particle collector generally designated 28. As more clearly shown in Fig. 2, the mechanical collector comprises one or more gas turning units 30. Each unit is formed of a plurality of spaced vanes 32 angularly disposed to the gas flow. At the apex of the vanes forming each unit is a suspended particle trap 34 in the form of a U-shaped trough. The lower end of each trap 34 is connected to a cross flue 36 through which the collected particles and a portion of the gas stream is drawn by a blower 38.

The skimmed particles and gas are moved by the blower 38 through flue 40 to a cross flue or header 42 positioned at the forward or gas inlet end of the electrostatic precipitation units. A plurality of small flues 44 which, as more clearly seen in Figs. 1 and 3, project into the inlet conduit introduce the collected material uniformly into the lower portion of the incoming gas stream just ahead of the first dust collecting hopper 12.

A horizontal rapper bar 45 may be secured to the U-shaped particle traps 34, for example, by welding. A suitable vibratory motor or swing hammer, not shown in the drawings, may be employed to impart vibratory impulses to the bar to clean the mechanical dust separators of collected dust.

In operation dust-laden gases enter the dust collector through inlet conduit 22 and then pass serially through the electrostatic dust collecting units where substantially the greater part of the suspended material is precipitated on the collecting electrodes 20.

The gas stream containing small quantities of coarse and carboniferous particles which have escaped collection in the electrostatic units enter the mechanical collectors 28. The gas is given a sharp change in direction as it flows between the vanes 32, as indicated by the arrows in Fig. 2 of the drawings. The suspended particles, due to their momentum and the centrifugal force of the turning gas, continue in substantially straight paths and are eventually collected in the U-shaped end members 34 while the clean gases pass out through the conduit 24. The concentrated suspended particles along with a small portion of the gas stream are drawn through flue 36 and blown through flue 40 by the auxiliary blower 38. The concentrated particles are then discharged into the incoming dirty gas stream by discharge pipes 44 which have outlets positioned just above the collecting hoppers into which substantially all of these particles fall.

In Figs. 4 and 5 of the drawings there is shown a mechanical vane type dust collector, similar in design to the collector 28, positioned in the gas inlet conduit of the collection unit. In Figs. 4 and 5 the casings of the electrostatic dust collectors are designated 10', and are provided with dust hoppers 12', 14'. . . . An inlet conduit 22' directs a stream of gas to be cleaned through the gas distribution baffle plate 46 and then into the electrostatic treating zone. In the conduit 22' and ahead of the baffle plate 46 is positioned a vane type mechanical dust collector 28'.

The mechanical collector comprises gas turning units 30'. Each unit is V-shaped and formed of a plurality of spaced vertical vanes 32' angularly disposed to the gas flow. At the apex of each unit is a suspended particle trap 34'. At the lower end of the traps are dust and gas outlet flues 36' through which the collected particles and a small portion of the gas stream are drawn by a blower 38'.

The skimmed particles and gas are then forced by the blower 38' through flue 40' and outlet pipes 44' adjacent the lower edge and the gas inlet side of the baffle plate 46. Thus the skimmed particles are uniformly deposited across the lower portion of the inlet conduit in such a position that they are readily collected in the electrostatic precipitator hoppers. The gas stream minus substantially all of the coarse and carboniferous particles proceeds through the electrostatic precipitation units and issues as clean gas at the far end of the last unit of the series, not shown in the drawings.

A horizontal rapper bar 45' may be secured to the U-shaped particle traps 34', for example, by welding. A suitable vibratory motor or swing hammer, not shown in the drawings, may be employed to impart vibratory impulses to the bar to clean the mechanical dust separators of collected dust.

Figs. 6 and 7 of the drawings show a modified form of the electro-mechanical collector described hereinbefore with reference to Figs. 4 and 5. In Figs. 6 and 7 a dirty gas inlet conduit 22'' directs a stream of gas to be cleaned through a vane type mechanical dust collecting unit 28''. The mechanical collector generally comprises a group of gas turning units 30'', formed of a plurality of spaced vertical vanes 32'' angularly disposed to the gas flow. The gases are given a sharp turn as they pass through the openings between the vanes and the coarse and carboniferous particles suspended in the gas are thrown out and collected with a small portion of the gas stream in particle traps 34'' positioned at the apex of the V-shaped mechanical collectors. At the lower end of the traps are dust and skimmed gas outlets which communicate with short discharge flues 44''. The flues 44'' uniformly deposit the collected particles and skimmed gas across the lower portion of the gas inlet conduit, adjacent a perforated baffle plate 46' at the inlet end of a system of electrostatic precipitators generally designated 52. The precipitators are of the horizontal gas flow type and the gas stream after passing through the mechanical collectors flows between the collecting plate electrodes 18' and the discharge electrodes 20', whereby the remaining suspended material is precipitated on to the collecting electrodes 18'. The particles thus collected fall into the precipitation unit hoppers, one of which is shown at 12''. The clean gas then issues from the far end of the electrostatic precipitation unit through an outlet conduit not shown in the drawings.

A horizontal rapper bar 45'' may be secured to the U-shaped particle traps 34'', for example, by welding. A suitable vibratory motor or swing hammer, not shown in the drawings, may be employed to impart vibratory impulses to the bar to clean the mechanical dust separators of collected dust.

In Figs. 8 and 9 of the drawings there is shown a further modification of the electro-mechanical dust collector of the invention. In the form of the invention shown in Figs. 8 and 9 the mechanical collectors are ahead of the electrostatic precipitation units and the skimmed particles and a small portion of the gas stream are discharged adjacent the gas inlet end of the dust hopper of the first precipitation unit.

In the drawings one of a group of series flow electrostatic precipitators is shown at 52'. The precipitator is provided with a casing 10''', at the lower end of which is a dust receiving hopper 12'''. Within the precipitation chamber are a plurality of collecting plate electrodes and discharge electrodes. Gas to be cleaned is directed into the precipitators through inlet conduit 22'''. At the intersection of the inlet conduit with the casing of the precipitator there is positioned a perforated gas distribution baffle 46'''. A group of mechanical dust separators 54 are provided in the gas inlet conduit forwardly of the baffle plate 46'''.

The mechanical separators generally comprise a plurality of tubular gas conduits 56 positioned parallel to the gas flow. Within the conduits 56 the gas streams are split by concentric members 58 which have on their exterior surfaces helical vanes 60 for throwing the suspended particles outwardly against the inner walls of the conduits 56. The coarse and carboniferous particles in the gas stream and a small portion of the gas stream itself passes through skimmer openings 62, while the primary stream of gas minus the larger particles passes through the exit openings 64. The dust so skimmed together with a limited amount of gas is drawn from the traps 66 through ducts 68 by blower 38'''. The blower then forces the collected material through flue 40'' and discharge ducts 44'''. The ducts 44''' are spaced across the floor of conduit 22''' with their discharge openings adjacent the baffle plate 46''' and the dust hopper 12'''. The collected particles drop into the hopper and the partially cleaned gases flow through the electrostatic dust separators 52'.

While the mechanical collectors shown in Figs. 8 and 9 are positioned at the forward end of the electrostatic precipitators it will be seen that this form of the mechanical collectors may be positioned at the down stream end of the precipitators and the skimmed off portion of gas and collected material returned to the gas inlet end substantially as shown in Figs. 1 through 3 of the drawings.

From the foregoing description it will be seen that the invention provides an improved electro-mechanical dust separation unit whereby the aims, objects, and advantages of the invention are fully accomplished.

It will be evident that various modifications may be made in the construction and form of the device. For example, while the electrostatic dust precipitation units have been shown and described as having extended surface plate type collecting electrodes placed in series relation, parallel units may be employed, and various types of complementary discharge and collecting electrodes may be used. It is further evident that while only two forms of mechanical collectors have been shown, other forms may be satisfactorily employed in the device of the invention, for example, mechanical dust collectors such as disclosed in U. S. Patent 2,506,273 to Linderoth.

I claim:

1. An apparatus for separating suspended particles from gases comprising an electrostatic precipitator including complementary collecting and discharge electrodes, a particle receiving hopper beneath the complementary electrodes and a gas inlet and outlet means; a mechanical separator adapted to concentrate a portion of the suspended particles in a portion of the gas, conduit means directing a flow of gases through said mechanical collector and said electrostatic precipitator; and conduit means directing a stream of gas including the concentrated particles from the mechanical separator to the lower portion of the gas inlet to the electrostatic precipitator adjacent said receiving hopper.

2. An apparatus for separating suspended particles from gases as defined in claim 1 wherein the conduit means direct the flow of gases first through said electrostatic precipitator and then through said mechanical separator.

3. An apparatus for separating suspended particles from gases as defined in claim 1 wherein the conduit means direct the flow of dirty gases first through said mechanical separator and then through said electrostatic precipitator.

References Cited in the file of this patent

UNITED STATES PATENTS

| | | |
|---|---|---|
| 2,593,251 | Bonacci et al. | Apr. 15, 1952 |
| 2,677,434 | Hedberg et al. | May 4, 1954 |

FOREIGN PATENTS

| | | |
|---|---|---|
| 425,039 | Germany | Feb. 11, 1926 |
| 709,677 | France | Aug. 12, 1931 |